United States Patent
Lewallen

(10) Patent No.: US 6,213,221 B1
(45) Date of Patent: Apr. 10, 2001

(54) BEARING ASSEMBLIES FOR AGRICULTURAL IMPLEMENTS

(75) Inventor: Dennis L. Lewallen, Beloit, KS (US)

(73) Assignee: Sunflower Manufacturing Company, Inc., Beloit, KS (US)

( * ) Notice: Subject to any disclaimer, the term of this patent is extended or adjusted under 35 U.S.C. 154(b) by 0 days.

(21) Appl. No.: 09/243,940

(22) Filed: Feb. 4, 1999

(51) Int. Cl.$^7$ ........................... A01B 15/14
(52) U.S. Cl. ........................... 172/776; 111/54
(58) Field of Search .................. 172/311, 452, 172/454, 456, 459, 776; 111/54, 55, 57, 59; 16/2.1, 87.8, 221, 225, 273; 403/52, 378, 379.3; 384/275, DIG. 909

(56) References Cited

U.S. PATENT DOCUMENTS

| | | |
|---|---|---|
| 3,541,011 | 11/1970 | Davis et al. . |
| 3,801,209 * | 4/1974 | Matsuoka ............... 403/225 |
| 3,971,601 * | 7/1976 | Sytsma .................. 308/16 |
| 4,102,402 * | 7/1978 | Steinberg ............... 172/40 |
| 4,357,249 | 11/1982 | Mellor . |
| 4,489,033 * | 12/1984 | Uda et al. ............... 264/328.7 |
| 4,718,780 | 1/1988 | Trudeau . |
| 4,790,389 * | 12/1988 | Adee et al. ............. 172/776 |
| 4,864,684 * | 9/1989 | Gellenthin, Jr. ......... 16/2 |
| 4,877,090 * | 10/1989 | Gullickson .............. 172/102 |
| 4,878,767 * | 11/1989 | Halder .................. 384/275 X |
| 4,936,206 | 6/1990 | Miles et al. . |
| 5,185,508 * | 2/1993 | Perkinson, III .......... 219/86.24 |
| 5,488,996 * | 2/1996 | Barry et al. ............. 172/311 |
| 5,509,738 * | 4/1996 | Haynes et al. .......... 384/275 |
| 5,511,365 | 4/1996 | Rice . |
| 5,553,380 | 9/1996 | Rice . |
| 5,658,030 * | 8/1997 | Ghosh et al. ........... 16/107 X |
| 5,896,820 * | 4/1999 | Klinkner et al. ........ 111/191 |
| 5,941,511 * | 8/1999 | Dawda et al. .......... 267/140.12 |
| 6,035,460 * | 3/2000 | Borter .................. 4/607 |
| 6,042,131 * | 3/2000 | Bailey .................. 280/86.75 |
| 6,076,247 * | 6/2000 | Durand ................. 29/505 |

FOREIGN PATENT DOCUMENTS

402120515 * 5/1990 (JP) ........................ 384/275

OTHER PUBLICATIONS

1968 Oldsmobile Chassis Service Manual, pp. 4–1–4–4, Jan. 1968.*
PST Performance Suspension Technology advertisement, Musclecar Review Magazine, pp. 70 & 72, Jan. 1990.*
Just Suspension advertisement, Musclecar Review Magazine, back cover, Jan. 1990.*
Sales Literature of Sunflower Manufacturing Co., Inc. for Series 330–Blade Plows, published in 1996.
Sales Literature of Sunflower Manufacturing Co., Inc. for Series 1000 Discs, published in 1997.

* cited by examiner

Primary Examiner—Victor Batson
(74) Attorney, Agent, or Firm—Shughart Thomson & Kilroy P.C.

(57) ABSTRACT

Improved bearing assemblies for agricultural implements and in particular flexible frame towed agricultural implements such as plows and the like are disclosed. The bearing assemblies preferably include a bearing formed from ultra high molecular weight polyethylene. The improved bearing assembly includes a flanged cylindrical bearing sleeve adapted for use with a hinge connecting adjacent frame sections of a flexible frame towed agricultural implement. The flanged cylindrical bearing sleeve is positioned within an outer cylindrical metal bearing sleeve which is mounted in the end of a male hinge member in alignment with a pivot pin receiving bore extending therethrough. A pivot pin extending through the flanged cylindrical bearing sleeve connects a hinge clevis on a female hinge member to the male hinge member. A flange on the flanged cylindrical bearing sleeve extends between thrust bearing surfaces on the male hinge member and the female hinge member. A bearing assembly for a coulter for the implement includes an inner cylindrical bearing sleeve positioned between a coulter pivot shaft and an outer bearing sleeve on a coulter arm.

4 Claims, 3 Drawing Sheets

BEARING ASSEMBLIES FOR AGRICULTURAL IMPLEMENTS

BACKGROUND OF THE INVENTION

The present invention relates to improved bearing assemblies for flexible frame towed agricultural implements for use in cultivation and the like and in particular bearing assemblies for such implements incorporating cylindrical bearings formed from ultra high molecular weight polyethylene.

Flexible frame towed agricultural implements have been developed to permit cultivation of uneven terrain with wider implements. The flexible frame towed implements generally comprise a plurality of rigid frames pivotally secured together in side by side alignment transverse to the direction of travel of the towing vehicle with a tool or set of tools connected to each frame. A plurality of hinges connect adjacent frame members. Each hinge generally comprises a male hinge member extending from the side of a first frame and a female hinge member extending from the side of a second or adjacent frame. The hinge members are generally formed from square tubing and the male hinge tube has a bore extending through the front and rear walls thereof. An outer cylindrical bearing sleeve, formed of metal, is welded inside of the end of the first length of square tubing in alignment with the bores in the front and rear walls thereof. An inner cylindrical bearing sleeve, formed of metal, is positioned within the outer cylindrical bearing sleeve.

The female hinge member includes a hinge clevis welded to a distal end of a section of square tubing. The distal end of the male hinge member on the first frame extends between front and rear ears of the hinge clevis such that the bores in the front and rear walls of the male hinge member are aligned with bores in the front and rear ears of the hinge clevis. A pivot pin extends through the bores in the ears of the hinge clevis, the bores in the front and rear walls of the male hinge tube and through the inner cylindrical bearing sleeve such that the male and female hinge tubes pivot about the pivot pin and relative to one another.

A grease zerk is secured to the outer cylindrical bearing sleeve and accessible through the end of the male hinge tube. Grease is injected between the inner and outer cylindrical bearing sleeves through the grease zerk for lubrication and to reduce wear. The continuing need to grease the numerous sets of bearing sleeves in a large implement consumes a considerable amount of time. Even with routine greasing, the outer cylindrical bearing sleeve will experience wear due to the metal on metal contact with the inner cylindrical bearing sleeve, which may require replacement of the outer cylindrical bearing sleeve. Because the outer cylindrical bearing sleeve is generally welded to the male hinge tube, its replacement is generally difficult and time consuming.

In addition to wear on the cylindrical bearing sleeves, the forward advancement of the implement generally thrusts either the front or rear wall of the male hinge tube against the front or rear ear of the hinge clevis respectively causing wear therebetween. The wear between the respective clevis ear of the female hinge tube and the wall of the male hinge tube may result in the need for additional costly repairs. To extend the life of the implements, users will grease the bearing surfaces between the hinge clevis and the male hinge tube, which only adds to the time required for routine maintenance.

Coulter mounting assemblies on many implements also require considerable maintenance and are subject to wear. Coulters are typically mounted on a hub which is connected to a coulter arm having a cylindrical bearing sleeve mounted on an end of the coulter arm opposite the hub. The cylindrical bearing sleeve is pivotally secured to a coulter shaft which is secured to and depends from the implement frame in front of a tool. The cylindrical bearing sleeve pivots about the coulter shaft to permit rotation of the coulter as the implement frame makes a turn. The metal on metal contact between the cylindrical bearing sleeve and the coulter shaft results in wear which can be reduced by the application of grease therebetween. Although the grease reduces wear it does not eliminate it and often the cylindrical bearing sleeve along with the coulter shaft need to be replaced. Further, the multiple greasings necessary to avoid excessive wear further increase the time necessary for routine maintenance. There remains a need for improved towed flexible frame agricultural implements with reduced maintenance needs which also resist wear at hinge points.

SUMMARY OF THE INVENTION

The present invention comprises improved bearing assemblies for agricultural implements and in particular flexible frame towed agricultural implements such as plows and the like. In one embodiment the improved bearing assembly includes a flanged cylindrical bearing sleeve adapted for use with a hinge connecting adjacent frame sections of a flexible frame towed agricultural implement. The flanged cylindrical bearing sleeve is preferably formed from ultra high molecular weight polyethylene and is positioned within an outer cylindrical metal bearing sleeve which is mounted in the end of a male hinge member in alignment with a pivot pin receiving bore extending therethrough. A pivot pin extending through the flanged cylindrical bearing sleeve connects a hinge clevis on a female hinge member to the male hinge member. A flange on the flanged cylindrical bearing sleeve extends between thrust bearing surfaces on the male hinge member and the female hinge member.

A bearing assembly for a coulter for the implement includes an inner cylindrical bearing sleeve positioned between a coulter pivot shaft and an outer bearing sleeve on a coulter arm. The inner cylindrical bearing sleeve is also preferably formed from ultra high molecular weight polyethylene.

OBJECTS AND ADVANTAGES OF THE INVENTION

The objects of this invention include providing a flexible frame towed agricultural implement that requires less maintenance; providing such a flexible frame towed agricultural implement which resists wear without greasing; providing such a flexible frame towed agricultural implement which resists wear at hinge points; providing such a flexible frame towed agricultural implement which resists wear at a thrust bearing surface of a hinge assembly; and providing such an implement which is particularly well adapted for its intended uses.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

DETAILED DESCRIPTION OF THE INVENTION

Figure 1:
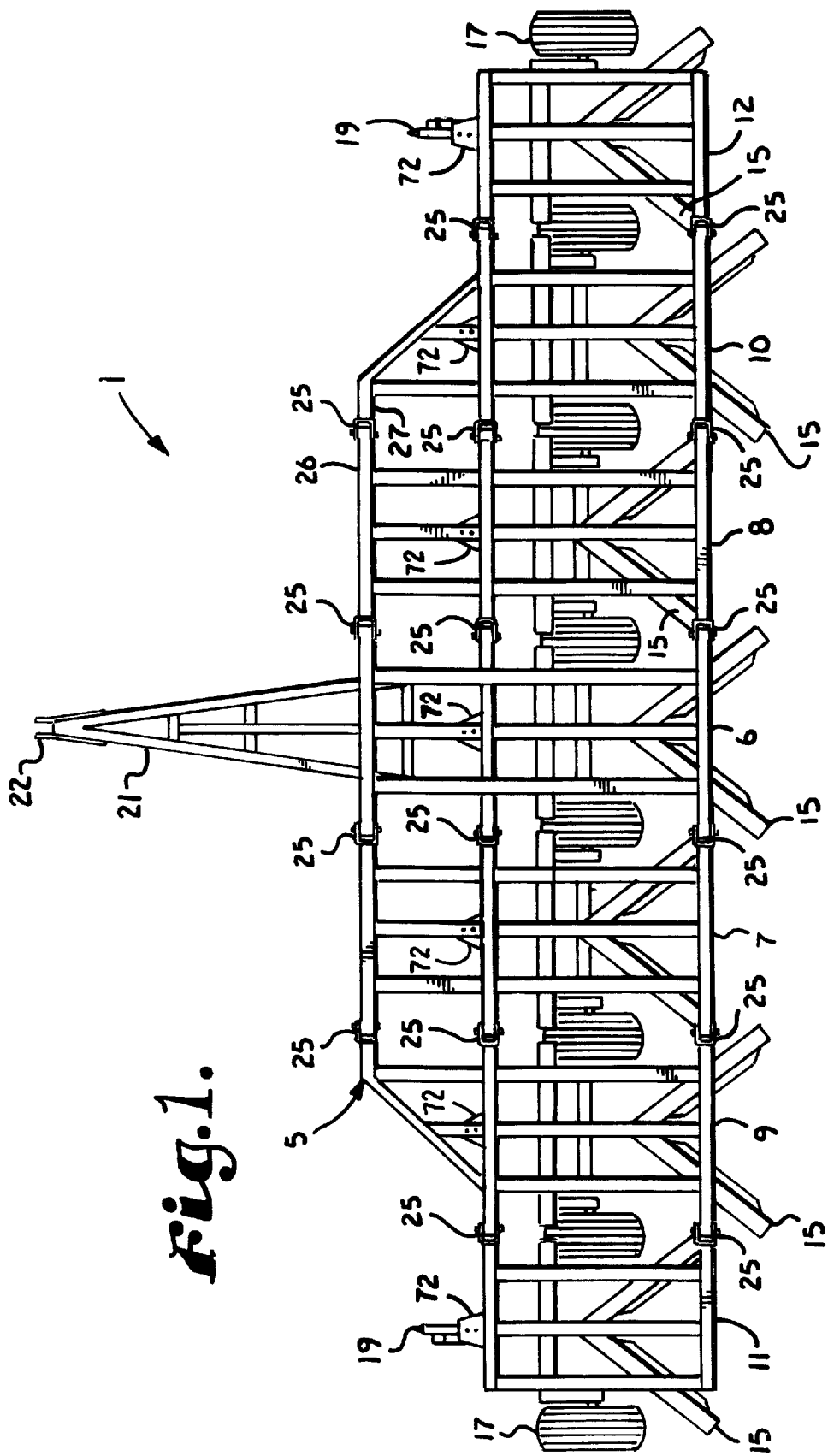
FIG. 1 is a top plan view of a flexible frame blade plow with portions removed for clarity.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to the drawings in more detail, the reference numeral 1 refers to a flexible frame towed agricultural implement and in particular a plow adapted to be towed behind a towing vehicle (not shown) such as a tractor or the like. The implement 1 generally includes a frame 5 comprising a plurality of rigid frame sections 6–12 pivotally secured together in side by side alignment transverse to the direction of travel of the towing vehicle. The frame sections 6–12 comprise center frame section 6, left and right inner wings 7 and 8, left and right middle wings 9 and 10, and left and right outer wings 11 and 12. While seven frame sections 6–12 are shown and described herein, any number of frame sections could be used. The frame sections 6–12 are generally formed from square or rectangular tubing. Attached to each of the frame sections 6–12 is a tool, illustrated herein as a sweep 15.

A plurality of wheels 17 are attached to the frame 5. Each wheel 17 is mounted on a pivotal arm 18 which is pivotally connected to one of the frame sections 6–12. Hydraulic actuators, not shown, are connected to the pivotal arms 18 to permit adjustments in the height of the frame sections 6–12 relative to the wheels 17. A coulter 19 is mounted to each frame section 6–12 in front of the apex or point of each sweep 15. A tongue 21 is connected to and extends forward from the center frame section 6 and includes a hitch 22 at a forward end thereof for securement to a towing vehicle 2.

Figure 2:
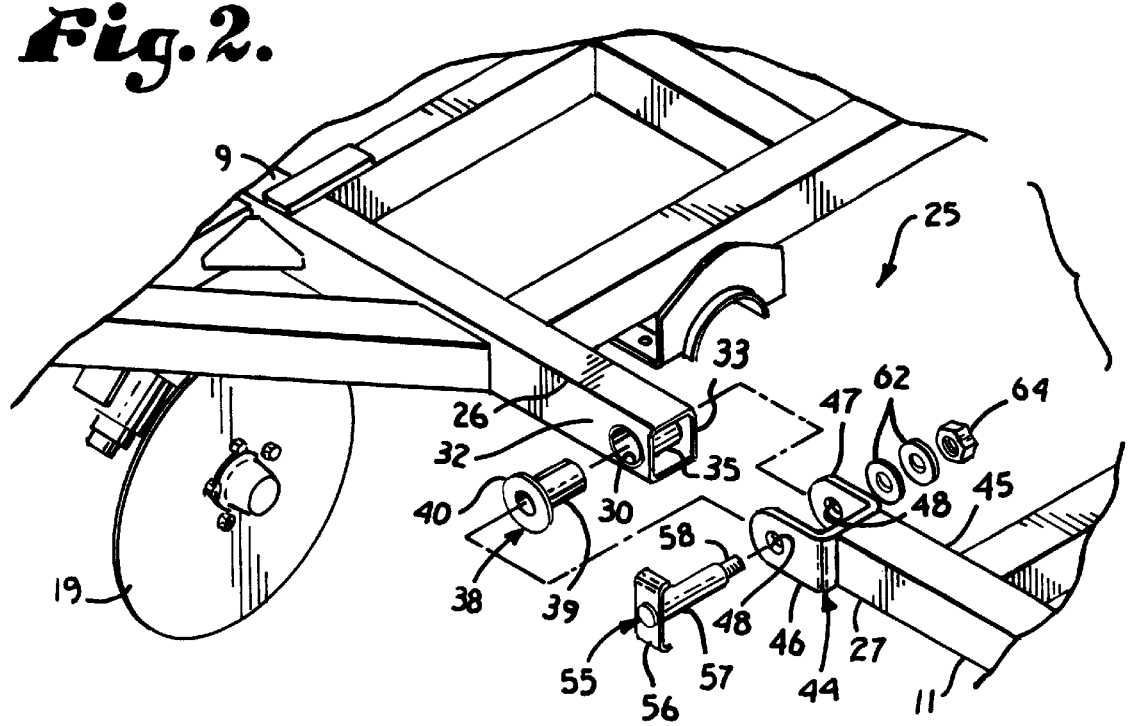
FIG. 2 is an enlarged, fragmentary and exploded perspective view of a portion of the flexible frame blade plow showing a hinge assembly for connecting adjacent frame sections and with portions removed for clarity.
Figure 3:
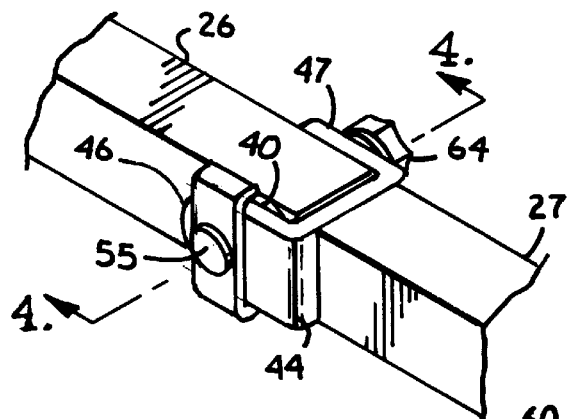
FIG. 3 is an enlarged and fragmentary perspective view of a hinge assembly.
Figure 4:
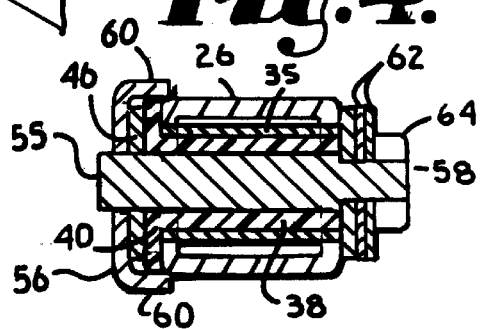
FIG. 4 is a cross-sectional view taken along line 4—4 of FIG. 3.

Each frame section 6–12 is pivotally connected to adjacent frame sections 6–12 by a plurality of hinges 25 each of which is of similar construction. Each hinge 25 comprises a male hinge member 26 extending from one of the frame sections 6–12 and a female hinge member 27 extending from an adjacent frame section 6–12. For example as shown in FIG. 2, the hinge 25 shown, comprises male hinge member 26 extending from left middle wing 9, and female hinge member 27 extending from left outer wing 11. The hinge members 26 and 27 are generally formed from the same type of square or rectangular tubing used to form the frame sections 6–12.

A bore 30 extends through front and rear walls 32 and 33 respectively of the male hinge member 26 proximate a distal end thereof. An outer cylindrical bearing sleeve 35, formed of metal, is welded inside of the end of the male hinge member 26 in alignment with the bore 30 of the front and rear walls 32 and 33 respectively. The hinge 25 also includes an inner flanged bearing 38, comprising a cylindrical sleeve 39 and a flange 40 extending around the outer periphery of one end of the cylindrical sleeve 39. The inner flanged bearing 38 is sized for positioning of the cylindrical sleeve 39 within the outer cylindrical bearing sleeve 35 such that the bearing flange 40 abuts against either the front wall 32 or rear wall 33 of the male hinge member 26. The outer diameter of the cylindrical sleeve 39 of inner flanged bearing 38 is slightly smaller than the inner diameter of the outer cylindrical bearing sleeve 35 to permit free rotation therebetween.

The inner flanged bearing 38 is preferably formed from plastic and in particular from an ultra high molecular weight polyethylene. Ultra high molecular weight ("UHMW") polyethylene generally comprises a linear polyethylene with an average molecular weight in the range of approximately 1,000,000 to 6,000,000. UHMW polyethylene has a low coefficient of friction and exhibits excellent dimensional stability and a good wear rate.

The female hinge member 27 includes a hinge clevis 44, welded to a distal end of a section of frame tubing 45 extending from a side of the associated frame section, left outer wing 11 in FIG. 2. The hinge clevis 44 includes front and rear ears 46 and 47 having bores 48 extending therethrough. The distal end of the male hinge member 26 extends between the front and rear ears 46 and 47 of the hinge clevis 44 such that the bores 30 in the front and rear walls 32 and 33 of the male hinge member 26 are aligned with the bores 48 in the front and rear ears 46 and 47 of the hinge clevis 44. A pivot pin 55 having head 56, shaft 57 and threaded end 58 of reduced diameter, connects the female hinge member 27 to the male hinge member 26. The female hinge member 27 is connected to the male hinge member 26 by pivot pin 55 such that the flange 40 of inner flange bearing 38 is positioned between the front wall 32 of male hinge member 26 and front ear 46 of hinge clevis 44 or between the rear wall 33 of male hinge member 26 and rear ear 47 of hinge clevis 44 as will be discussed in more detail below.

The pivot pin shaft 57 extends through the inner flanged bearing 38. The pivot pin head 56 is generally U-shaped, having legs 60 adapted to engage upper edges of the ear 46 or 47 against which it is positioned to prevent rotation of the pivot pin 55. The threaded end 58 extends beyond the ear 46 or 47 opposite the ear 46 or 47 against which the head 56 abuts. Washers 62 and bolt 64 are secured to threaded end 58 to secure the pivot pin 55 in place and secure the connection of the male hinge member 26 to the female hinge member 27.

In the embodiment shown in FIGS. 1–4, the flange 40 of inner flange bearing 38 is positioned between the front wall 32 of the male hinge member 26 and the front ear 46 of the hinge clevis 44. The diameter of flange 40 is sized to correspond to the diameter or width of each of the ears 46 and 47. The flange 40 prevents wear between the front wall 32 of the male hinge member 26 and the front ear 46 of the hinge clevis 44 as front wall 32 of male hinge member 26 is pulled toward the front ear 46 as the implement 1 is towed. The flange 40 may also be positioned between the rear wall 33 of the male hinge member 26 and the rear ear 47 of the hinge clevis 44, such as if the relative position of the male hinge member 26 and female hinge member 27 are reversed such that the rear ear 47 of the hinge clevis 44 is pulled toward the rear wall 33 of the male hinge member 26 as the implement is towed. The wall 32 or 33 of the male hinge member 26 against which the front or rear ear 46 or 47 of the hinge clevis 44 is thrust as the implement is towed may also be referred to as the thrust bearing surface.

The hinges 25 permit pivoting of adjacent frame sections 6–12 relative to one another to permit the frame 5 to generally conform to the contours of the land being worked by the implement 1. In addition, the frame sections 6–12 may be folded relative to one another at the hinges 25 to fold the frame 5 to a reduced width for towing. For example, in the seven section frame 5 as shown in FIG. 1, left and right outer wings 11 and 12 are folded upward relative to the left and right middle wings 9 and 10 about hinges 25 to a relationship of approximately ninety degrees by hydraulic actuators which are not shown. The left and right middle wings 9 and 10 are then folded upward relative to the left and right inner wings 7 and 8 about hinges 25 to a relationship of approximately ninety degrees.

The cylindrical sleeve 39 of the inner flanged bearing 38 formed from ultra high molecular weight polyethylene is particularly well adapted for reducing wear between pivot pin 55 and outer cylindrical bearing sleeve 35 without the need for greasing. The flange 40 of the inner flanged bearing 38 formed from ultra high molecular weight polyethylene is particularly well adapted for reducing wear between the bearing surfaces of the male hinge member 26 and the hinge clevis 44.

Figure 5:
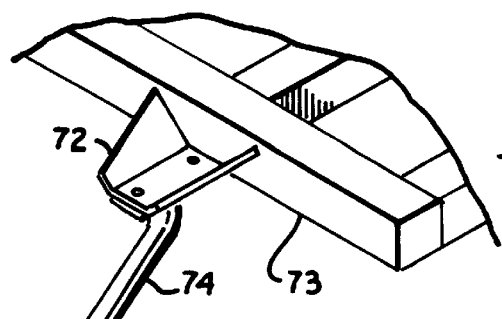
FIG. 5 is an enlarged, fragmentary and exploded perspective view of a portion of the flexible frame blade plow showing a coulter assembly.
Figure 6:
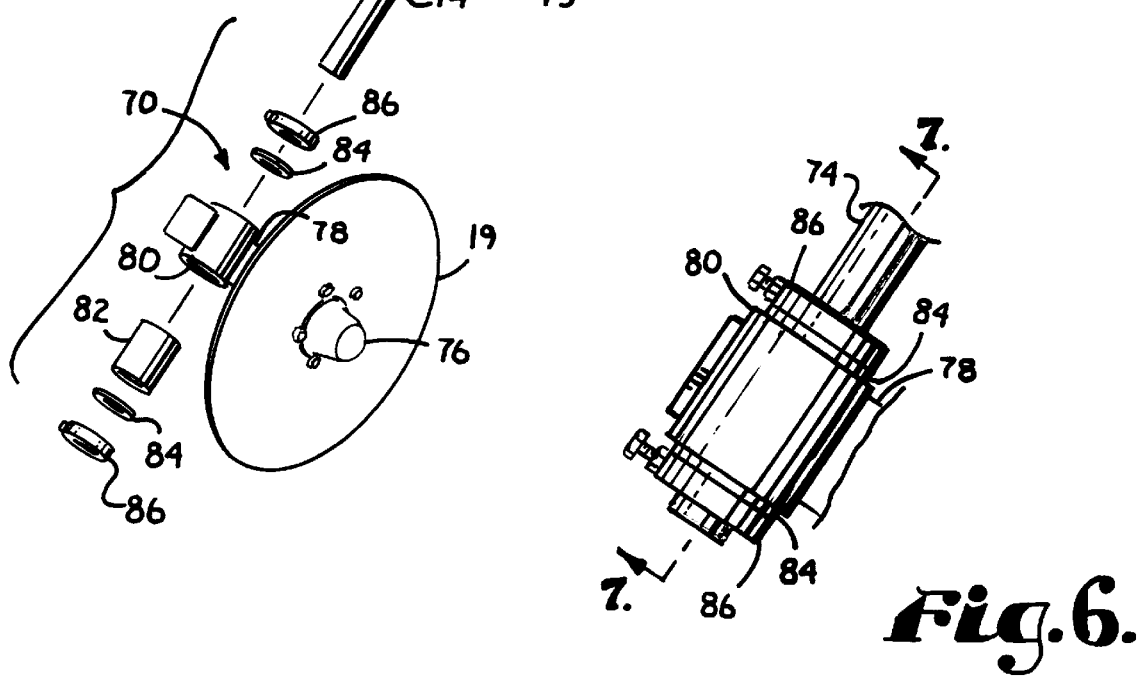
FIG. 6 is an enlarged and fragmentary right side elevational view of a bearing assembly for the coulter assembly.
Figure 7:
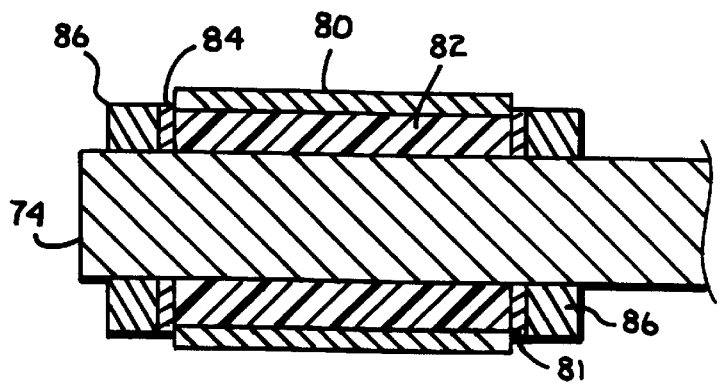
FIG. 7 is a cross-sectional view taken along line 7—7 of FIG. 6.

FIGS. 5–7 show a coulter mounting assembly 70. The coulter mounting assembly 70 includes a bracket 72 welded to and extending forward of a transverse frame member 73 of each frame section 6–12. A coulter shaft or pivot shaft 74 is secured to and extends downward and forward from the bracket 72 at an angle of approximately forty-five degrees. The coulter 19 is bolted to a hub 76 which is connected to a coulter arm 78 at one end thereof. An outer cylindrical bearing sleeve 80 is connected to the coulter arm 78 at an end opposite the hub 76. The outer cylindrical bearing sleeve 80 is mounted on the pivot shaft 74 with an inner cylindrical bearing sleeve 82 positioned between the pivot shaft 74 and the outer cylindrical bearing sleeve 80. The inner cylindrical bearing sleeve 82 is formed from an ultra high molecular weight polyethylene. The inner and outer cylindrical bearing sleeves 82 and 80 are secured in position on the pivot shaft 74 by washers 84 and lock collars 86 mounted on the pivot shaft 74 on opposite ends of the bearing sleeves 82 and 80. When the outer cylindrical bearing sleeve 80 is mounted on the pivot shaft 74, the coulter arm 78 extends downward and rearward and such that the coulter 19 is generally positioned in spaced relation in front of and in alignment with the apex of an associated sweep 15.

The inner diameter of the inner cylindrical bearing sleeve 82 is slightly greater than the outer diameter of the pivot shaft 74 and the outer diameter of the inner cylindrical bearing sleeve is slightly less than the inner diameter of the outer cylindrical bearing sleeve 80 to permit free rotation of the outer cylindrical bearing sleeve 80 relative to the inner cylindrical bearing sleeve 82 and the pivot shaft 74.

It is to be understood that while certain forms of the present invention have been illustrated and described herein, it is not to be limited to the specific forms or arrangement of parts described and shown.

What is claimed and desired to be secured by Letters Patent is as follows:

1. A flexible frame towed agricultural implement comprising:

a) a first frame section;

b) a second frame section positioned adjacent said first frame section;

c) a male hinge member extending from said first frame section; said male hinge member having a front wall and a rear wall and a pivot pin receiving bore extending through said front and rear walls;

d) an outer cylindrical bearing sleeve secured within said male hinge member in alignment with said pivot pin receiving bore;

e) a female hinge member extending from said second frame section and having a hinge clevis formed on a distal end thereof; said hinge clevis comprising front and rear hinge ears positioned in overlapping relationship with said front and rear walls of said male hinge member respectively;

f) an inner flanged cylindrical bearing sleeve having a cylindrical sleeve portion and an outwardly extending flange formed at one end thereof; said inner flanged cylindrical bearing sleeve positioned within said outer cylindrical bearing sleeve such that said flange extends between said front wall of said male hinge member and said front ear of said hinge clevis; and g) a pivot pin extending through said inner flanged cylindrical bearing sleeve and said pivot pin receiving bore of said male hinge member and secured to said front and rear ears of said hinge clevis.

2. The implement as in claim 1 wherein:

a) said inner flanged cylindrical bearing sleeve is formed from ultra high molecular weight polyethylene.

3. The implement as in claim 1 wherein:

a) said flange has an outer diameter which closely approximates the width of said hinge ears.

4. The implement as in claim 3 wherein:

a) said inner flanged cylindrical bearing sleeve is formed from ultra high molecular weight polyethylene.

\* \* \* \* \*